(12) United States Patent
Procida (10) Patent No.: US 7,829,009 B2
(45) Date of Patent: Nov. 9, 2010

(54) PROCESS FOR THE PRODUCTION OF A POLYMER LAYER OF A FLEXIBLE OFFSHORE PIPE AND A FLEXIBLE UNBONDED OFFSHORE PIPE

(75) Inventor: Inger-Margrethe Procida, Hellerup (DK)

(73) Assignee: NKT Flexibles I/S, Brondby (DK)

( * ) Notice: Subject to any disclaimer, the term of this patent is extended or adjusted under 35 U.S.C. 154(b) by 736 days.

(21) Appl. No.: 10/507,215

(22) PCT Filed: Mar. 20, 2003

(86) PCT No.: PCT/DK03/00191

§ 371 (c)(1),
(2), (4) Date: Sep. 16, 2004

(87) PCT Pub. No.: WO03/078134

PCT Pub. Date: Sep. 25, 2003

(65) Prior Publication Data

US 2005/0221033 A1 Oct. 6, 2005

(30) Foreign Application Priority Data

Mar. 20, 2002 (DK) ............... 2002 00434
Jun. 14, 2002 (DK) ............... 2002 00900

(51) Int. Cl.
*B29C 47/00* (2006.01)
*B29C 35/08* (2006.01)
(52) U.S. Cl. .............. 264/476; 264/448; 264/464; 264/477; 264/492; 264/493; 264/494; 264/495; 264/177.17; 264/177.18; 264/173.11; 264/209.1; 264/209.6; 264/236
(58) Field of Classification Search .......... None
See application file for complete search history.

(56) References Cited

U.S. PATENT DOCUMENTS 2,528,523 A * 11/1950 Kent ..................... 428/379

(Continued)

FOREIGN PATENT DOCUMENTS

EP 0 870 800 A1 10/1998

(Continued)

OTHER PUBLICATIONS

*Recommended Practice for Flexible Pipe*, 17B, Second Ed., American Petroleum Institute, Jul. 1, 1998.

(Continued)

*Primary Examiner*—Jeffrey Wollschlager
(74) *Attorney, Agent, or Firm*—Pearne & Gordon LLP (57) ABSTRACT

The invention relates to a process for the production of a polymer layer of a flexible unbonded offshore pipe. The process comprises the steps of shaping a polymer material by extrusion into or onto a supporting unit in an extrusion station and cross-linking said extruded polymer material, said polymer material comprising a polyethylene and a peroxide for providing a cross-linking of the polymer material. The peroxide has an activation temperature substantially above the temperature of the polymer material during the extrusion thereof. The cross-linking of the extruded polymer material is carried out by exposing the extruded polymer material to electromagnetic waves, selected from the group consisting of infrared radiation and microwave.

The invention also relates to a flexible unbonded offshore pipe comprising such polymer layer.

64 Claims, 1 Drawing Sheet

U.S. PATENT DOCUMENTS

| | | |
|---|---|---|
| 3,095,608 A | 7/1963 | Munsell |
| 3,513,228 A * | 5/1970 | Miyauchi .................... 264/476 |
| 3,868,436 A | 2/1975 | Ootsuji et al. |
| 3,928,525 A | 12/1975 | Fuwa et al. |
| 4,107,245 A | 8/1978 | Jansson |
| 4,117,195 A | 9/1978 | Swarbrick et al. |
| 4,144,111 A | 3/1979 | Schaerer |
| 4,455,460 A | 6/1984 | Bunnell |
| 4,528,155 A | 7/1985 | Elder |
| 5,573,720 A | 11/1996 | Kotzer |
| 5,716,574 A | 2/1998 | Kawasaki |
| 5,918,641 A * | 7/1999 | Hardy et al. ................. 138/132 |
| 6,053,214 A | 4/2000 | Sjoberg et al. |
| 6,106,761 A * | 8/2000 | Sjoberg et al. ............. 264/492 |
| 6,123,114 A * | 9/2000 | Seguin et al. ............... 138/124 |
| 6,192,941 B1 | 2/2001 | Mallen-Herrero et al. |
| 6,797,741 B1 * | 9/2004 | Heino ........................ 522/157 |
| 2001/0021426 A1* | 9/2001 | Procida et al. ............. 428/35.8 |
| 2002/0183412 A1* | 12/2002 | Harlin et al. .................. 522/60 |

FOREIGN PATENT DOCUMENTS

| | | | |
|---|---|---|---|
| EP | | 0 921 921 | 6/1999 |
| GB | | 956808 | 4/1964 |
| GB | | 1 373 256 | 11/1974 |
| GB | | 2 350 168 A | 11/2000 |
| GB | | 2 357 559 A | 6/2001 |
| WO | | 91/19924 | 12/1991 |
| WO | | 97/10936 | 3/1997 |
| WO | | 99/67560 | 12/1999 |
| WO | WO99/67560 | * | 12/1999 |
| WO | | 00/70256 | 11/2000 |
| WO | | 01/00381 A1 | 1/2001 |
| WO | WO01/00381 | * | 1/2001 |
| WO | WO 01/38060 | | 5/2001 |
| WO | WO01/38060 | * | 5/2001 |
| WO | | 02/078952 A1 | 10/2002 |

OTHER PUBLICATIONS

*Recommended Practice for Flexible Pipe*, 17B, Third Ed., American Petroleum Institute, Mar. 2002.

* cited by examiner

FIGURE 1

PROCESS FOR THE PRODUCTION OF A POLYMER LAYER OF A FLEXIBLE OFFSHORE PIPE AND A FLEXIBLE UNBONDED OFFSHORE PIPE

This is a nationalization of PCT/DK03/00191 filed Mar. 20, 2003 and published in English.

FIELD OF THE INVENTION

The present invention relates to a process for the production of a polymer layer of a flexible offshore pipe. The invention also relates to a process for the production of a flexible offshore pipeline comprising a polyethylene containing polymer layer, e.g. an inner liner. The invention also concerns a flexible offshore pipe comprising a polymer layer obtainable according to the process.

BACKGROUND OF THE INVENTION

Flexible offshore pipes comprising a tube-formed inner liner and at least one reinforcement layer are generally used for the transportation of oil and gas products over long distances and often at elevated temperatures, such as above 60° C. or more.

Offshore pipes are also used for injection of chemicals into a sub-sea drilled well e.g. connected between a host oil platform and a sub-sea satellite installation.

Offshore pipes must be capable of operating at high pressures, and the pipes should be resistant to chemicals and water, including seawater. Furthermore such offshore pipes should be flexible so that they can be spooled onto a drum or reel.

Offshore pipes are normally very long, so-called risers often several hundred meters long and so-called flow-lines often several kilometers long. They are laid on the seabed, typically subjected to high pressures and pressure differences along the pipeline. When the pipeline is transporting oil or gas, the pipelines may be exposed to temperatures substantially above 60° C. The offshore pipes should therefore be capable of operating at high temperatures and high pressures.

Offshore pipes generally comprise one or more tube-formed barrier layers including an inner liner and at least one reinforcing layer. The inner liner is the innermost polymer layer, which in known offshore pipes also constitutes a barrier layer, and which is exposed to a fluid, e.g. oil transported in the pipeline. In most situations, the pipeline also comprises an outer sheath providing a barrier to the outer environment such as seawater. The pipe normally comprises one or more reinforcing layers between the inner liner and the outer sheath, and some pipes also comprise a reinforcing layer inside the pipe, called a carcass. The carcass prevents collapse of the inner liner and provides mechanical protection to the inner liner. Some pipes also comprise one or more intermediate polymer layers.

The inner liner should be chemically stable and mechanically strong even when subjected to high temperatures. Furthermore, the inner liner should be manufactured in one piece since repair, welding or other types of connecting methods are not acceptable for inner liners in offshore pipelines. The inner liner is therefore normally produced by continuous extrusion of a polymer. A number of polymers are presently used for the production of inner liners, such as Polyamide-11 (PA-11), polyethylene (PE) and Polyvinylidene diflouride (PVDF).

These materials shall fulfill the combined requirements of e.g. heat stability, resistance to crude oil, seawater, gases, mechanical fatigue, ductility, strength, durability and processability. The inner liner material is normally selected on a case-to-case basis after careful investigation of the conditions for the planned installation. Here, cross-linked polyethylene may in many cases prove to fulfill the requirements.

Additionally, the interest in use of inner liners in corrosive applications with high concentrations of carbon dioxide and/or hydrogen sulphides is increasing. Furthermore, polyamides are susceptible to hydrolysis and aliphatic polyketones are also susceptible to degradation at elevated temperatures. However, the permeability of gases increases with temperature, and polyethylene has a relatively high permeability to gases. Thus permeation of gases like methane, carbon dioxide and hydrogen sulphide may in some cases be prohibitive for use of cross-linked polyethylene inner liners at high temperatures.

In EP 487 691 it has been suggested to use an inner liner of cross-linked polyethylene. An inner liner with such cross-linked material has shown to be highly improved compared to inner liners of the similar non-cross-linked (thermoplastic) material.

In order not to degrade the material, the process in the prior art of producing an inner liner is carried out in two steps, first the material in non-cross-linked form is manufactured by extrusion, and afterwards the material is cross-linked. When the material is cross-linked, it is only to some degree possible to change its shape without degrading the material.

The cross-linking step is often very cumbersome and time and space demanding. EP 487.691 describes the cross-linking step of silanized polyethylene with reference to the figures. The pipeline is first manufactured by extrusion of the inner layer of polyethylene, followed by metal armouring and outer sheathing. The entire multilayer pipe structure is mounted with end fittings, and the flexible pipe is connected to a device for circulating water in the inner liner tube. The water is heated to about 92-98° C. and circulated using pumps. The time of cross-linking is between 48 and 120 hours followed by a cooling step for about 20 hours.

By this process, it is necessary to manufacture the entire pipe before making the actual cross-linking of the inner liner. In case of a quality problem of the inner liner, it appears impractical to make the entire pipe without assuring final properties of the cross-linked inner liner. The patent describes both the use of a Sioplas® process involving peroxide-activated grafting of the vinylsilane onto the polyethylene in a separate compounding step, and the Monosil® process with in-situ silane grafting of polyethylene. It is preferred to use a dibutyltindilaurate (DBTDL) as cross-linking accelerator and a density of the polyethylene above 931 $kg/m^3$, preferably over 940 $kg/m^3$.

The required properties for the other polymer layers, intermediate layer(s) and outer layer are much similar to the required properties of the inner liner.

A number of methods of producing PE based covers for cables are known e.g. as disclosed in U.S. Pat. Nos. 4,528,155 and 3,868,436, by extrusion of PE comprising a heat activatable peroxide, followed by subjecting the cover to heat e.g. by steam or pressurized Nitrogen to thereby initiate the cross-linking thereof.

SUMMARY OF THE INVENTION

The object of the present invention is to provide a process for the production of a cross-linked polymer layer for a flexible offshore pipe, which process can be used for long lengths of tubes, and which process results in a high degree of cross-linking even if the tube has a relatively thick wall.

A further object is to provide a process for the production of a polymer layer of an offshore pipe having a length of at least 50 meters by extrusion of a polyethylene based polymer followed by cross-linking, which method is faster and less space demanding than known processes.

Yet a further object of the invention is to provide a process for the production of a flexible unbonded offshore pipe comprising a tube-formed inner liner, which comprises extrusion of a polyethylene based polymer inner liner followed by cross-linking, which method is faster and less space demanding than known processes.

These and other objects are achieved by the invention as defined in the claims.

DISCLOSURE OF THE INVENTION

The process of the present invention may in principle be used for the production of any one of the polymer layers of a flexible offshore pipe. These polymer layers are also referred to as tube formed polymer layers. A flexible offshore pipe is also denoted an unbonded pipe, which means that the pipe comprises two or more layers which are not bonded along their entire length so that the individual layers can slide with respect to each other. This feature gives the offshore pipe a high flexibility.

The process of the invention is particularly useful for the production of flexible unbonded offshore pipes comprising tube-formed polymer layer(s), e.g. an inner liner, an intermediate polymer layer and/or a cover layer. The process is specifically useful for the manufacturing of so-called endless offshore pipes, i.e. pipelines having a length of 50 m or more.

The process for the production of a polymer layer according to the invention comprises the step of shaping a polymer material by extrusion into or onto a supporting unit in an extrusion station and in a subsequent step cross-linking the extruded polymer material to obtain hardening and high strength of the material.

The polymer material comprises a polyethylene and an amount of peroxide for cross-linking of the polyethylene. The peroxide should preferably have an activation temperature substantially above, preferably at least 5° C. above, and more preferably at least 10° C. above the temperature of the polymer material during the extrusion thereof. The term "substantially above the temperature of the polymer material during the extrusion thereof" means that the peroxide should not be activated during the extrusion.

The peroxide is thus chosen to have an activation temperature above the temperature of the polymer material during extrusion to avoid that activated peroxide will induce cross-linking during extrusion. During extrusion, cross-linking of the polymer is highly undesired as it will complicate the extrusion and result in clogging of the equipment. In one embodiment of the invention, the extrusion and the cross-linking steps are carried out in an in-line process, including passing the extruded polymer material directly through a cross-linking zone with means to activate the peroxide to obtain cross-linking. Thus, the cross-linking step is carried out in a separate step subsequent to the extrusion step.

In one embodiment, the polymer layer is passed from the extruder to the cross-linking zone with less than 25° C. average intermediate cooling, such as less than 10° C. average intermediate cooling, such as essentially no intermediate cooling. The term "average cooling" means average through the thickness of the polymer layer. Thus, the surface of the polymer layer may be cooled down more than the middle of the material. In one embodiment, it is desired that the cooling of the surface of the polymer layer does not exceed 40° C., preferably the cooling of the surface of the polymer layer does not exceed 20° C. from the extruding zone to the cross-linking zone.

The polymer material, which is shaped during the process, comprises polyethylene. In a preferred embodiment, polyethylene constitutes the major part of the polymer material, and only minor parts of other polymers are present. For some purposes, it is preferred that polyethylene is the only polymer material present. Also mixtures of polyethylene with different or varying properties may be used according to the invention, e.g. mixtures of two or more polyethylenes with different densities. By selecting polyethylenes with different densities and optionally other polymers and additives it is possible to design a polymer composition with desired properties.

Polyethylene is often used for inner liners for offshore flexible pipes at operational temperatures up to about 60° C. Primarily the high density polyethylene (HDPE), which has a substantially linear chain structure, is used. The HDPE has a somewhat higher stiffness and mechanical strength than other polyethylene types. Also, it has a higher crystallinity and therefore a lower permeability to gases. The typical HDPE used for inner liners is pipe grades with a density of 945 to 965 kg/m$^3$, and preferably around 950 kg/m$^3$. Preferred polyethylene to be used according to the invention has a density above 920 kg/m$^3$, such as e.g. from 940 kg/m$^3$ and up to about 965 kg/m$^3$, that provides polyethylene which has the best properties for use as inner liners according to the invention. The inner liner may in one embodiment be a co-extruded layer comprising two or more sub layers e.g. of PE with different densities. The co-extruded materials may e.g. be cross-linked in one cross-linking step using electromagnetic waves according to the invention.

In general, to obtain the best possible properties it is preferred that the polymer material comprises at least 50% by weight, preferably at least 70% by weight, more preferably at least 85% by weight of polyethylene.

The polymer material may in one embodiment include up to about 40% by weight, such as up to about 20% or preferably up to about 10% by weight of additional polymer(s) other than polyethylene. The additional polymer(s) may e.g. be selected from the group consisting of thermoplastics such as thermoplastic elastomers including block copolymer such as SEBS, SBS, SIS, TPE-polyether-amide, TPE-polyether-ester, TPE-urethanes, TPE PP/NBR, TPE-PP/EPDM, TPE-vulcanisates and TPE-PP/IIR; rubbers such as butadiene rubber, isoprene rubber, nitril rubber, styrene-butadiene rubber and urethane rubber; polyolefins such as polypropylene and polybutylene including its isomers; liquid crystal polymers; polyesters; polyacrylates; polyethers; polyurethane; thermplastic vulcanisates; and Liquid Silicone Rubber.

The polyethylene material typically contains minor amounts of additives like pigments, heat stabilisers, process stabilisers, metal deactivators, flame-retardants and/or reinforcement fillers. It is preferred to keep the amount of such additives low to reduce the risk of blistering and stress induced cracking. The reinforcement fillers may e.g. include glass particles, glass fibres, mineral fibres, talcum, carbonates, mica, silicates, and metal particles.

In one embodiment, the polymer layer is a co-extruded layer comprising two or more co-extruded polymer sub layers of equal or different material compositions. These co-extruded sub layers may preferably be cross-liked in one step, whereby the material sub layers will bind to each other. Thus, in one embodiment the polymer layer comprises co-extruded sub layers in the form of an innermost sub layer of a polyethylene material with a higher amount of fillers, and an outermost sub layer of a polyethylene material with a lower amount of fillers.

According to the invention the cross-linking of the polymer material is initiated by peroxide serving as a radical-former when activated. A specific peroxide decomposes at a specific temperature (the activation temperature of the peroxide). The preferred peroxides according to the invention also decompose if they are exposed to certain electromagnetic wavelengths, e.g. microwave or infrared light. The decomposition causes the peroxide to release radical-formers which induce cross-linking in the polymer material. The temperature during the extrusion is typically between 145 to 200° C. The temperature during extrusion is selected to keep the polymer material in a molten state. Cross-linking of the polymer is undesired during extrusion as it will make the extrusion more difficult. Thus, it is preferred to select a peroxide having an activation temperature above 145° C. or even above 150° C. Preferably the selected peroxide has an activation temperature which is substantially above such as at least 1° C., and preferably at least 5 to 10° C. above the temperature of the polymer material during the extrusion. Consequently it is preferred to select a peroxide with a higher activation temperature such as butylcumylperoxide, dicumylperoxide, Trigonox 145B 2,5-dimethyl hexane 2,5-di-t-butyl peroxide, bis(t-butylperoxy isopropyl)benzene, t-butyl cumyl peroxide, di-t-butyl peroxide, 2,5-dimethyl hexine-3 2,5-di-t-butyl pero or a hydroperoxide, e.g. butylhydroperoxide. According to the invention the peroxide may be activated by exposing the extruded polymer material to electromagnetic waves, selected from the group consisting of infrared radiation and microwave.

The peroxide is added to the polyethylene before extrusion. The peroxide may be added in solid state as powder or granulate. Alternatively the peroxide may be added in liquid form. When the peroxide is added in liquid form, it is preferred that the polyethylene is present with about 90% of granules and about 10% of powder.

In general, the amount of peroxide in the polymer composition should preferably be at least 0.1% by weight of the polymer composition, such as between 0.2 and 3% by weight of the polymer, more preferably up to about 2% or even more preferably up to about 1.5% by weight of the total polymer composition including peroxide.

To obtain a satisfactory cross-linking of the polymer material when using infrared radiation for activating peroxide, it is preferred that the polymer composition contains peroxide from 0.1 to 1.0% by weight, and preferably from 0.2 to 0.8% by weight of the total polymer.

The process of the invention comprises the step of exposing the extruded polymer material to electromagnetic waves selected from the group consisting of infrared radiation and microwave, i.e. in the range of about 0.5 m to 0.5 m. In one embodiment, the extruded polymer material is exposed to electromagnetic waves for a sufficient time to thereby raise the temperature of the extruded polymer material at least to the activation temperature of the peroxide. The necessary time for exposing thereby depends largely on the type of peroxide, the thickness of the material, the intensity and wavelength of the electromagnetic radiation, as well as the initial temperature of the extruded polymer material at its entrance into the cross-linking zone.

According to the invention the extruded polymer material is passed to a cross-linking zone to initiate the cross-linking. The cross-linking is initiated by activating the peroxide by use of electromagnetic waves, such as infrared radiation.

In one embodiment, the cross-linking is activated by exposing the extruded polymer to electromagnetic waves with a wavelength measured in vacuum of between 0.5 μm and 20 cm, such as between 0.8 μm and 10 cm, such as between 1.0 μm and 1 cm. In one embodiment the cross-linking is activated by exposing the extruded polymer to electromagnetic waves with a wavelength measured in vacuum of between 2.0 μm and 1000 μm.

In one preferred embodiment, the cross-linking is activated by exposing the extruded polymer to infrared radiation. In one embodiment using infrared radiation to activate the peroxide it is desired that the melted polymer material from the extruder is sufficiently transparent to allow the infrared radiation to penetrate the polymer material to induce the cross-linking. Thereby even thick layers of extruded polymer can be cross-linked very fast. The preferred embodiment comprises use of polyethylene heated above the crystalline melting temperature $T_s$ (approximately 125-130° C.) to obtain a glass clear and amorph polymer material. Under such conditions the activation of peroxide and cross-linking of the polymer material will appear within seconds. Generally the cross-linking appears relatively fast when using infrared radiation activated peroxides, and the polymer material may be cross-linked within 60 seconds. According to the invention the supporting unit may comprise means that reflects infrared radiation, such as a metal-foil or other reflecting foils. The polymer composition itself may also include particles which may reflect the electromagnetic waves, e.g. metal particles or glass beads. However, in one embodiment the amount of additives in the polymer composition should be kept at low level, e.g. below 10% by volume such as below 5% by volume in order to maintain the transparent appearance of the polymer composition.

In one embodiment using microwave to activate the peroxide, the amount of additives in the polymer composition may be higher, e.g. above 5% by volume or even above 10% by volume because the polymer layer to be cross-linked need not be transparent. Therefore in situation where the polymer layer is not sufficiently transparent to be cross-linked using infrared radiation as a peroxide activator, the polymer layer may preferably be treated with microwave or with a mixture of microwave or infrared radiation.

In one embodiment using infrared radiation to activate the peroxide it is desired that the infrared radiation comprises wavelengths in the range 0.5-10 μm, more preferably at least 50% of the energy applied by infrared radiation is applied in the form of infrared radiation with wavelength in the range 0.5-10 μm, such as in the range 0.8-6.0 μm, such as in the range 1.0-5.0 μm.

Thus, it has surprisingly been found that the polymer layer can be cross-linked sufficiently fast to avoid deformation due to gravity forces of the melted and extruded layer even when the layer has a large thickness and thereby a high weight. The thickness of such offshore flexible pipe polymer layers may e.g. be about 4 mm or more, such as 6 mm or more, such as 8 mm or more, such as 10 mm or more, such as 12 mm or more, such as 14 mm or more, such as 16 mm or more, such as 18 mm or more.

It is particularly preferred that the cross-linking is activated by application of infrared radiation, where the infrared radiation comprises wavelengths corresponding to the absorption peaks for the polymer material. Thus, in one embodiment the maximum intensity of the infrared radiation is in the range 0.0-10 μm, such as in the range 1.0-7.0 μm, such as in the range 3.0-7.0 μm. Thereby the heating has shown to be very fast in the whole thickness of the layer even when the thickness is above 4 mm or thicker such as above 10 mm, such as 12 mm or more, such as 14 mm or more, such as 16 mm or more, such as 18 mm or more.

In one embodiment, wherein the cross-linking is activated by application of infrared radiation it has been found that a very fast cross-linking with at high degree of cross-linking can be obtained when using infrared radiation comprising wavelengths corresponding to the absorption peaks for the polymer material. Preferably the maximum intensity of the infrared radiation is in the range 0.7-10 µm, such as in the range 1.5-7.0 µm, such as in the range 3.0-7.0 µm. In particular, it is desired in this embodiment that the infrared radiation comprises wavelengths in the ranges 3.3-3.6 µm and/or 6.7-6.9 µm which are absorption peaks for polyethylene.

The infrared radiation source usable to activate the peroxide may be any type of IR lamp which radiates a suitable amount of infrared radiation, preferably with wavelengths as stated above. In one embodiment an infrared lamp with electromagnetic waves in the interval 0.5-5.0 m and with a peak around 1.2 m is used. The infrared radiation source is preferable placed in the cross-linking zone in such a way that all parts of the extruded polymer material are exposed to infrared radiation.

In one embodiment, the electromagnetic wave generating means in the cross-linking zone is preferably arranged in such a way that the polymer material is subjected to electromagnetic waves from all sides or angles in the cross-linking zone. For instance when the polymer material has a circular cross section, the electromagnetic wave generating means is placed all around the circumference of the cross-section to obtain the best possible heating effect on the polymer material.

The time for performing the cross-linking in the cross-linking zone in the heat activated embodiment depends mainly on the thickness of the polymer layer, the type of peroxide used including its activating temperature, and the method used for activating the peroxide in the cross-linking zone. In some applications, the cross-linking time may be relatively long, e.g. 10 minutes or even longer, but in order to optimize the in-line process and the space occupied by the cross-linking zone, the time for performing the cross-linking should preferably be adjusted to be about the time for extruding 0.05 to 2 m, preferably 0.2 to 1 m of the polymer material. This adjustment may be performed by regulating the application of heat, the selection of type of peroxide, and the thickness of the extruded polymer. Also the extrusion velocity may be adjusted.

In one embodiment, the process according to the invention includes the use of infrared heaters or microwaves as heating means, the extruded material is subjected to a heat treatment in the cross-linking zone for up to about 600 seconds and preferably for 5 to 120 seconds, and more preferably for 10 to 60 seconds.

In a preferred embodiment, the extruded polymer material is subjected to a heat treatment in the cross-linking zone at a temperature above 145° C. and preferably at a temperature between 150 and 200° C. to ensure activation of the peroxide. The optimal temperature depends on the type of peroxide and can easily be found by a few experiments.

When infrared heating lamps are used according to the invention, this has the advantage that the peroxide may be activated simultaneously by infrared light and heat. Hereby an excellent and rapid cross-linking can be obtained.

Compared with prior art techniques, it is possible to obtain a relatively high degree of cross-linking using the process according to the invention. In one embodiment, the degree of cross-linking obtained is 75 to 90%, and preferably the degree of cross-linking is 80 to 85 t according to ASTM D 2765. Thus, cross-linking may appear in both the amorphous and crystalline phase of the polymer material.

In a preferred embodiment of the process according to the invention, the pressure in the cross-linking zone is raised above ambient pressure. By increasing the pressure in the cross-linking zone, formation of bubbles and irregularities in the polymer material can be avoided. The pressure is preferably raised to 1.5 bars above ambient pressure, more preferably 2 bars above ambient pressure, and typically the pressure in the cross-linking zone is between 2.5 and 10 bars.

In order to avoid undesired deformation or reactions in the extruded polymer material, it is in one embodiment preferred that the extruded polymer material enters the cross-linking zone immediately after extrusion or no later than about 5 or even 2 minutes after extrusion. By passing the extruded polymer material from the extruder to the cross-linking zone, the temperature of the polymer material may be kept close to the extrusion temperature at the entrance to the cross-linking zone, which means that the necessary amount of energy for activating the peroxide is as low as possible. Generally, it is preferred that the temperature of the polymer material at the entrance to the cross-linking zone is at least 100° C., preferably at least 120° C. and even more preferably at least 140° C. The entrance is defined as the place between the extruder and the cross-linking zone where the temperature of the polymer material is lowest.

Moreover, in order to optimise the properties of the extruded product and avoid deformation it is preferred that the velocity of the extrusion of the polymer material is approximately equal to the velocity of the extruded polymer passing through the cross-linking zone, and the velocity is preferably between 0.2 to 2 m/minute, and more preferably between 0.5 and 1.0 m/minute.

Preferably the extruded polymer material from the cross-linking zone is cooled to ambient temperature, e.g. the polymer material may be cooled in a cooling zone with water or air.

The supporting unit may in principle be any kind of supporting means which supports the polymer material as it passes out from the extruder. The supporting unit onto which the polymer material may be extruded may simply be a mandrel, net or hollow wire. The supporting unit onto which the polymer material may be extruded may preferably be a tube-formed unit, such as a calibrating device (calibrator). Such calibrator is generally known from the art of extruding inner liners for flexible unbonded offshore pipes without inner reinforcing layer(s) (carcass). A calibrator may e.g. calibrate the outer dimension of the pipe or tube shaped polymer layer using vacuum suction onto a solid surface e.g. metal surface, which surface may preferably be wetted with water for lubrication.

Thus, in a preferred embodiment the polymer layer is an inner liner of a flexible unbonded offshore pipe without carcass, and the inner liner is extruded into a supporting unit, preferably in the form of a calibrator.

In a preferred embodiment of the process according to the invention, the supporting unit is a reinforcement material, and preferably a reinforcement layer of a flexible unbonded offshore pipe.

The supporting unit may e.g. be in the form of a carcass, in which case the polymer layer is an inner liner of a flexible unbonded offshore pipe and the polymer material is extruded onto the carcass to form the inner liner.

Where the polymer layer is an intermediate layer of a flexible unbonded offshore pipe, the supporting unit may preferably be in the form of a pressure armour, and the polymer material is extruded onto the pressure armour.

Where the polymer layer is an outer cover of a flexible unbonded offshore pipe, the supporting unit may preferably be in the form of a tensile armour, and the polymer material is extruded onto the tensile armour. Please observe that the term "outer cover" does not exclude that further armouring layer or layers are applied around the outer cover, but in general this term should be interpreted to mean that the outer cover is the outermost pipe shaped polymeric layer.

In one embodiment, it is preferred that the supporting unit material is a metallic material, preferably shaped as a carcass, a pressure armour or a tensile armour of metallic material. The metallic material may preferably be capable of reflecting infrared radiation from the infrared radiation source or optionally heat from the heating means in the cross-linking zone, thereby increasing the effect of the infrared radiation or heating on the polymer material. This reflective effect will lead to faster and more effective activation of the peroxide and cross-linking of the polymer material.

When extruding a polymer layer onto a supporting unit in the form of a carcass or another armour, it is in one embodiment preferred that a secondary layer e.g. a tape or film layer is applied onto the armour prior to the application of the polymer layer. Thereby undesired deformation of the polymer layer due to the shape of the surface of the armour which may e.g. be made from profiles engaged into each other, may be avoided. In one embodiment, wherein the supporting unit is an armour layer and this secondary layer comprises a tape applied onto the armour and the polymer composition is extruded onto this tape, it is preferred that the tape has a reflecting surface reflecting the infrared radiation or heat applied in the cross-linking zone. The tape may e.g. comprise a metallized surface. The reflecting surface of the tape may preferably be capable of reflecting at least 50% of the infrared radiation or heat applied to the tape when using infrared light or infrared heating or microwave heating.

In one embodiment, the polymer layer may comprise a secondary layer below the polymer layer, said secondary layer preferably having a reflective surface reflecting the electromagnetic waves applied in the cross-linking zone. The reflective surface of the secondary layer may preferably be capable of reflecting at least 50% of the not adsorbed electromagnetic waves, which in practice means that the secondary layer is capable of reflecting at least 50% of the electromagnetic waves irradiated at the surface.

One embodiment, where the supporting unit is an armour layer, comprises a secondary layer such as a foil applied onto the armour, and the polymer composition is extruded onto this secondary layer. The secondary layer may e.g. be a permeation barrier e.g. as described later on for liquid and gas, such as methane, hydrogen sulphides and carbondioxides. Thereby armour layers placed on the outer side of the secondary layer are protected from such aggressive gasses which may be transferred in the pipe.

In one embodiment, the tube formed polymer article obtained by the process according to the invention is an inner liner of the offshore pipe.

The cumbersome and time-consuming cross-linking of the inner liner as well as the outer cover and/or intermediate layer or layers of a flexible pipe product, as described in EP 487.691, can be overcome by the present invention, in particular by initiating the cross-linking in-line (or on-line) with the extrusion of the inner liner. By in-line is simply meant 'in the same continuous process step'. As a result the liner material completes the cross-linking within the cross-linking zone without any further treatment, and e.g. before the final multilayer pipe structure is completed.

By the present invention, cross-linking of the inner liner may be terminated prior to the making of the metal armouring and outer sheath and the end fittings. This is advantageous for several reasons. Quality control is made earlier in the production cycle and necessary corrections can be made earlier. Also, by the present invention it is possible to cut samples from the end of the cross-linked inner liner for measurements of the degree of cross-linking. It is not possible to do this on a finished pipe. If this should be done on a pipe according to the EP 487.691, it would require cutting off a section of the pipe and establishing a new end fitting, which is costly and time consuming.

In one embodiment according to the process of the invention, polyethylene and other ingredients for the polymer composition including the peroxide and accelerator may be melted and homogenised in an extruder which feeds the polymer melt into a distributor and a tool, either a crosshead tool or a pipe tool. With a crosshead tool, a metal carcass may be fed into the centre of the crosshead tool, and the polymer may be extruded around this metal cylinder. The carcass may be at ambient temperature (cold) or preheated to avoid rapid quenching of the polymer melt. The inner liner thickness may typically be 4 to 10 mm when using a carcass, and somewhat larger, typically 6 to 16 mm without a carcass. However, the thickness of the inner liner may differ from the above typical values, depending on the contemplated use of the pipe. For some uses a thickness below 4 or 6 mm is sufficient, such as down to 2 mm. For other uses thickness above 10 or 16 mm, e.g. 18 mm or more may be required.

After extrusion of the pipe using a crosshead tool into which the carcass is fed, the polymer melt forms a cylindrical object around the carcass. In one embodiment, the extruded pipe may directly after the extrusion be subjected to the radiation with electromagnetic waves and thereby be cross-linked.

Alternatively, the inner liner may be made without a metallic carcass e.g. using pipe tool (or a crosshead tool), and in this case the extruded object may pass through a calibrator as described above.

After the extrusion, the extruded polymer tube may be passed into a cross-linking zone as described. An example of an in-line cross-linking equipment is outlined in FIG. 1 and described below.

After cooling of the cross-linked polymer layer e.g. using water, the pipe passes out of the cooling chamber and is optionally dried, typically by a wipe-off device and blowing with air. Then a drawing device, typically a caterpillar device, draws the pipe forward. The polymer inner liner may here be cooled below the softening point, which may prevent the caterpillar belts from causing mechanical damage to the inner liner. After the caterpillar, the pipe is spooled on a drum, reel or turntable. The metal armouring and the subsequent extrusion of the outer sheath are normally performed in separate steps.

The invention also relates to a method for the production of a flexible unbonded offshore pipe comprising one or more polymer layers (inner liner, intermediate layer or layers and outer cover) in the form of a tube-formed polymer layer wherein at least one of the polymer layers is produced according to the process defined in the claims.

In one embodiment, the method comprises the steps of
i) providing a carcass
ii) applying a secondary layer in the form of a gas permeation barrier layer onto the carcass,
iii) applying an inner liner in the form of a polymer layer according to the process as described above, wherein the polymer material is applied onto a supporting unit, iv) applying one or more reinforcing layers onto the inner liner.

In another embodiment, the method comprises the steps of
i) providing an inner liner in the form of a polymer layer according to the process as described above, wherein the polymer material is applied into a supporting unit,
ii) applying a secondary layer in the form of a gas permeation layer onto the inner liner
iii) applying one or more reinforcing layers onto the inner layer.

The secondary layer may e.g. be IR reflective as described above.

The gas permeation barrier layer may e.g. be in the form of a foil, such as a metal foil, or in the form of a polymer. The permeation barrier layer means a layer of a material which provides a higher permeation barrier, such as 50% higher, such as 100% higher such as 500% higher barrier than the inner liner against hydrogen sulphides, and preferably also against methane and carbondioxides. In one embodiment, the permeation barrier layer is a polymer layer. The permeation barrier layer is preferably thinner that the inner liner such as up to about 50%, such as up to about 20% of the thickness of the inner liner. The permeation barrier layer and the inner liner may e.g. be co-extruded and optionally cross-linked in one step of irradiation with electromagnetic waves e.g. IR.

In one embodiment, the permeation barrier layer is a foil which is wound or bent around the carcass or a removable support tool. The foil may preferably be applied with overlapping edges to thereby form a complete layer. Thereafter the polymer layer may be applied using the method as defined in the claims, including cross-linking using electromagnetic waves. During the cross-linking the foil will adhere or be bonded to the polymer layer, and simultaneously the overlapping edges will be held closely together to form a high permeation barrier layer. In one embodiment, the permeation barrier layer is essentially impermeable to one or more of the gasses hydrogen sulphides, methane and carbondioxide preferably all of the gasses at a partial pressure for the respective gasses of 0.03 bar or more, such as 0.1 bar or more, such as 1 bar or more, such as 10 bars or more. In one embodiment the permeation barrier layer is essentially impermeable to sulphides at a partial pressure of 0.03 bars or more, such as 0.1 bars or more, and to methane at a partial pressure of 1 bar or more, such as 10 bars.

Furthermore, the invention relates to a flexible unbonded offshore pipe comprising at least one polymer layer, said polymer layer being obtainable using the process as defined in the claims.

The flexible unbonded offshore pipe may have any shape e.g. as known from WO 00/36324 and U.S. Pat. No. 6,085, 799, which are hereby incorporated by reference. One or more of the tube-formed polymer layers, e.g. the inner liner, intermediate layer or layers and/or outer cover, may be produced using the process of the invention.

Figure 1:
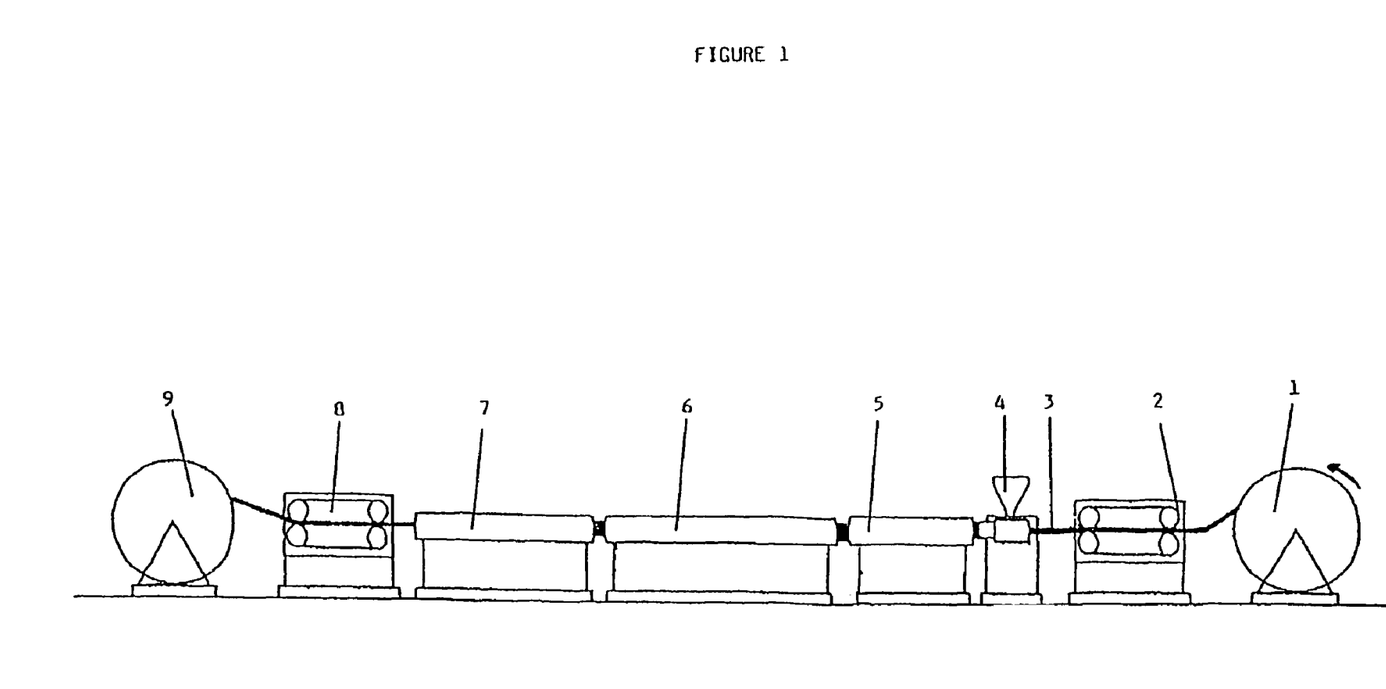
FIG. 1 is a sketch of a production line usable in the process of the invention.

FIG. 1 is a sketch of a production line for the production of an inner liner for an offshore pipeline. A carcass, i.e. a metal armouring 3, of an offshore pipeline is unwound from a pay-off device 1 and passes through a caterpillar device 2. An extrusion device 4 extrudes a polyethylene inner liner onto the carcass, and the extruded inner liner passes together with the carcass directly to a cross-linking zone 5, where it is subjected to a treatment with electromagnetic waves, e.g. with infrared radiation. From the cross-linking zone 5 it passes into a first cooling zone 6, wherein the heated polyethylene inner liner is cooled. From the first cooling zone 6, it passes into a second cooling zone 7, wherein it is further cooled. From the second cooling zone 7, it passes through a second caterpillar device 8 and further to a take up device 9 onto which it is wound.

The present invention includes passing the extruded polymer material directly through a cross-linking zone. In the cross-linking zone, the material is subjected to an intensive heating, e.g. with infrared radiation. In the cross-linking zone, the activation means e.g. infrared lamps are arranged to surround the extruded polymer material so as to subject the polymer material to infrared radiation from all sides or angles. The extruded polymer material preferably enters the cross-linking zone immediately after extrusion or no later than 2 minutes after extrusion.

The velocity of the extrusion of the polymer material is approximately equal to the velocity of the extruded polymer passing through the cross-linking zone. A preferred velocity is between 0.2 to 2 m/minute, preferably between 0.5 and 1.0 m/minute.

From the crosshead tool, the pipe preferably passes into a first chamber, wherein it is subjected to infrared light or heat, e.g. from infrared sources.

The pipe should preferably be in the first chamber for a sufficient time to initiate cross-linking of the inner liner. The necessary time can be determined by cross-linking thin samples for various periods of time. Based on this time and the knowledge of the extrusion line speed, the necessary minimum length of the first chamber can be calculated.

After being treated in a first cross-linking chamber, the inner liner may optionally be introduced into a second chamber, where the inner liner is cooled optionally by water cooling.

After being treated in a first cross-linking chamber and optionally a second cooling chamber, the inner liner may be introduced into a third chamber, where the inner liner is further cooled.

The third chamber may preferably be a traditional cooling chamber with water suspension or water spraying onto the pipe containing the inner liner. Typically, tap water at ambient temperature is used or recirculating water connected to a heat exchanger. Time and thus length of the chamber should preferably be sufficient to cool down the pipe to below approximately 60° C. to ensure sufficient strength of the inner liner so that it may be handled by the caterpillar belts without any damage.

The total length of the cross-linking and cooling chambers should preferably for practical reasons be kept below 100 meters in length. On the other hand, the cooling sections in the prior art processes are typically several tens of meters in length. The total length of a line for prior art extrusion of large dimension flexible pipes is well above one hundred meters.

Please observe that all though the first chamber, the second chamber and the third chamber, respectively, are sometimes referred to as one chamber, these chambers each represent a treatment, which in practice may be conducted in two or more physically separated treatment chambers. Consequently, the first chamber represents a first step of the treatment of the extruded inner liner, the second chamber represents a second step of the treatment of the extruded inner liner, and the third chamber represents a third step of the treatment of the extruded inner liner.

However, according to the invention the cooling of the polymer material may optionally be effected in one step in one chamber as one cooling treatment.

One effect of cross-linking polyethylene is that the material may be used at higher operating temperatures without being deformed due to excellent chemical and mechanical properties. It is expected that the operating temperature can be increased from approximately 60° C. to approximately 90° C. for typical offshore applications.

A few simple methods of characterising the cross-linking are probe penetration, hot set and the degree of cross-linking determined by decaline extraction.

The hot set test, as specified in IEC 811-2-1, clause 9and as used in several electrical cable standards as e.g. VDE 0273 and IEC 502, measures the mechanical elongation (set) of a test specimen at 200° C. under a specified load. The lower the value is, the higher the degree of cross-linking. If not cross-linked at all, the sample will simply flow away. It further measures a cold set after removal (a residual set). A well cross-linked sample will have essentially no cold residual set.

The degree of cross-linking is measured by decaline extraction according to the ASTM D 2765 standard prescribing a 6-hour extraction. The degree of cross-linking is simply the relative weight of unextractable material. By experience, values for cross-linked polyethylene are normally in the 75% to 80% range. The inventors' experience with new improved process is that the degree of cross-linking is often higher, in the 80 to 90% range. This method of measuring the degree of cross-linking suffers from the disadvantage of being destructive, because it is necessary to cut out a piece of the material. Thus this method is unsuitable for quality control of the cross-linking step of inner liners.

The probe penetration test measures the relative % of penetration of a 1 mm diameter cylindrical probe into a sample of the material at a given temperature under a given load. The inventors have found suitable parameters to be a load of 300 mN for samples of 2 to 3 mm thickness, and heating by 5° C./minute from 25° to 150° C. This method has the advantage of being non-destructive.

For cross-linked polyethylene with over 70% degree of cross-linking, the penetration at 140° C. is typically less than 25%. Un-cross-linked polyethylene has 100% penetration, and partially cross-linked samples give intermediate penetration values. We suggest the use of 30% as maximum penetration indicative of sufficient cross-linking, corresponding to approximately 65% degree of cross-linking.

EXAMPLE

On a full-scale production line an inner liner of polyethylene is extruded on a self-interlocking carcass of 6" inner diameter (15.2 cm). The outer diameter of this steel carcass is approximately 16.7 cm. The carcass is fed into the centre of a crosshead tool. In this tool, the polyethylene melt is distributed in a pipe type tool and upon the exit of the crosshead is drawn onto the carcass in approx. 6 mm thickness at a line speed of 0.48 to 0.55 meters/minute.

The extruder is a conventional polyethylene single screw extruder with a 120 mm screw diameter and an L/D ratio of 30, with a standard screw. The extrusion process is found not to be temperature sensitive. The temperature setting on the heating zones of the extruder and head ranges from 150 to 165° C., and melt temperature is typically 160° C.

The polyethylene is a mixture of 90% HD-PE, grade 5621from Basell and 10% UHW-PE powder, grade HE 2591 from Borealis. The additives are a mixture of 0.45% DYBP from Degussa and 0.40% Irganox XP621 from Ciba. DYBP (2,5-dimethyl hexine-3 2,5-di-t-butyl peroxide) is the peroxide which induces cross-linking of the PE. DYBP is activated by infrared radiation (DYBP may also be activated by heat at 180° C., thus the temperature in the extruder should not at any time exceed 175° C.). Irganox is an antioxidant. The material is fed into the extruder as a premix.

After the extrusion the pipe passes through an IR oven with a capacity of 75 kW. Residence time in the oven is 30-60 seconds.

After this the carcass with inner liner is cooled with water and led through a caterpillar.

Samples are cut from the inner liner. 2 mm thick sections are cut from the innermost and outermost part of the liner, respectively.

The degree of cross-linking and hot set at 200°C. is determined on these samples.

| Test results: | |
|---|---|
| Gel content %: | 76.3 |
| Hot set %: | 35 |
| Set %: | −5 |

The invention claimed is:

1. A process for the production of a flexible unbonded offshore pipe comprising at least one polymer layer with a thickness of at least about 4 mm, said method comprising shaping said polymer layer from a polymer material by extrusion in an extrusion station and cross-linking said extruded polymer material, said polymer material comprising a polyethylene and a peroxide for providing the cross-linking of the polymer material, said peroxide having an activation temperature substantially above the temperature of the polymer material during the extrusion thereof, said cross-linking of said extruded polymer material is activated by application of infrared radiation, the infrared radiation comprising wavelengths corresponding to the absorption peaks for the polymer material.

2. The process according to claim 1, wherein said peroxide has an activation temperature at least 10° C. above the temperature of the polymer material during the extrusion thereof.

3. The process according to claim 1, wherein said polymer material is shaped by extrusion into a supporting unit in the extrusion station.

4. The process according to claim 1, wherein said polymer material is shaped by extrusion into a supporting unit in the extrusion station.

5. The process according to claim 1, wherein said extruded polymer material is exposed to the infrared radiation for a sufficient time to thereby raise the temperature of the extruded polymer material at least to the activation temperature of the peroxide.

6. The process according to claim 1, wherein the extrusion and cross-linking are carried out in an in-line process, including passing the extruded polymer material from the extruder through a cross-linking zone to activate said peroxide to thereby cross-link the polymer material, and wherein said activation is performed by applying the infrared radiation in the cross-linking zone.

7. The process according to claim 1, wherein the extrusion and cross-linking are carried out in an in-line process, including passing the extruded polymer material from the extruder through a cross-linking zone to activate said peroxide to thereby cross-link the polymer material, and wherein said activation is performed by applying the infrared radiation in the cross-linking zone, said polymer material being passed from the extruder to the cross-linking zone with less than 10° C. average intermediate cooling.

8. The process according to claim 1, wherein said polymer material is shaped by extrusion onto a supporting unit in the extrusion station, and wherein the supporting unit is a reinforcement layer of the flexible unbonded offshore pipe.

9. The process according to claim 1, wherein said polymer material is shaped by extrusion onto a supporting unit in the extrusion station, and wherein the supporting unit is in the form of a carcass, said polymer layer being an inner liner of the flexible unbonded offshore pipe and said polymer material being extruded onto the carcass.

10. The process according to claim 1, wherein said polymer material is shaped by extrusion onto a supporting unit in the extrusion station, and wherein the supporting unit is in the form of a pressure armour, said polymer layer being an intermediate layer of the flexible unbonded offshore pipe and said polymer material being extruded onto the pressure armour.

11. The process according to claim 1, wherein said polymer material is shaped by extrusion onto a supporting unit in the extrusion station, and wherein the supporting unit is in the form of a tensile armour, said polymer material being extruded onto the tensile armour.

12. The process according to claim 1, wherein the polymer layer is an inner liner of the flexible unbonded offshore pipe.

13. The process according to claim 12, wherein said inner liner being extruded into a supporting unit, said supporting unit being in the form of a calibrating device which calibrates the outer dimension of the pipe using vacuum onto a supporting surface.

14. The process according to claim 1, wherein the polyethylene has a density of at least 920 g/cm$^3$.

15. The process according to claim 1, wherein the polyethylene has a density of at least 940 g/cm$^3$.

16. The process according to claim 1, wherein the polyethylene has a density of at least 945 g/cm$^3$.

17. The process according to claim 1, wherein the polyethylene has a density of at least 955 g/cm$^3$.

18. The process according to claim 1, wherein the polymer material comprises at least 50% by weight of polyethylene.

19. The process according to claim 1, wherein the polymer material comprises at least 85% by weight of polyethylene.

20. The process according to claim 1, wherein the polymer material comprises up to about 10% by weight of fillers.

21. The process according to claim 20, wherein the fillers are selected from the group consisting of pigments, heat stabilisers, process stabilisers, metal deactivators, flame retardants and reinforcement fillers.

22. The process according to claim 1 wherein the polymer material comprises up to about 40% by weight of additional polymers other than polyethylene.

23. The process according to claim 22, wherein said additional polymers are thermoplastics.

24. The process according to claim 1, wherein the amount of peroxide in the polymer material is at least 0.1% by weight of the polymer material.

25. The process according to claim 1, wherein the amount of peroxide in the polymer material is between 0.2 and 3% by weight of the polymer material.

26. The process according to claim 1, wherein the polymer material comprises peroxide from 0.1 to 1.0% by weight.

27. The process according to claim 1, wherein the polymer material comprises peroxide from 0.3 to 0.8% by weight.

28. The process according to claim 1, wherein the peroxide has an activation temperature above 145° C.

29. The process according to claim 28, wherein the peroxide is selected from the group consisting of butylcumyl peroxide, dicumyl peroxide, Trigonox 145B, hydroperoxide, 2,5-dimethyl hexane 2,5-di-t-butyl peroxide, bis(t-butylperoxy isopropyl) benzene, t-butyl cumyl peroxide, di-t-butyl peroxide, 2,5-dimethyl hexine-3 2,5-di-t-butyl peroxide and butylhydroperoxide.

30. The process according to claim 1, wherein at least 50% of the energy applied by the infrared radiation is applied in the form of infrared radiation with wavelengths in the range 0.5-10 μm.

31. The process according to claim 1, wherein at least 50% of the energy applied by the infrared radiation is applied in the form of infrared radiation with wavelengths in the range 1.0-5.0 μm.

32. The process according to claim 1, wherein the maximum intensity of the infrared radiation is in the range 0.5-10 μm.

33. The process according to claim 1, wherein the maximum intensity of the infrared radiation is in the range 1.0-7.0 μm.

34. The process according to claim 1, wherein the maximum intensity of the infrared radiation is in the range 3.0-7.0 μm.

35. The process according to claim 1, wherein the pressure in the cross-linking zone is raised to avoid formation of bubbles and irregularities.

36. The process according to claim 34, wherein the pressure in the cross-linking zone is raised above 2bars.

37. The process according to claim 1, wherein the extruded material is exposed to the treatment with the infrared radiation in said cross-linking zone for up to about 600 seconds.

38. The process according to claim 1, wherein the extruded material is exposed to the treatment with the infrared radiation in said cross-linking zone for 5 to 120 seconds.

39. The process according to claim 1, wherein the extruded polymer material is subjected to a treatment with the infrared radiation in said cross-linking zone, the temperature of the polymer material being raised to above 145° C.

40. The process according to claim 1, wherein the extruded polymer material is subjected to a treatment with the infrared radiation in said cross-linking zone, the temperature of the polymer material being raised to between 150and 200° C.

41. The process according to claim 1, wherein the degree of cross-linking obtained is 75 to 90%.

42. The process according to claim 1, wherein the degree of cross-linking obtained is 80 to 85%.

43. The process according to claim 1, wherein the extruded polymer material enters the cross-linking zone immediately after extrusion.

44. The process according to claim 1, wherein the extruded polymer material enters the cross-linking zone no later than 2 minutes after extrusion.

45. The process according to claim 1, wherein the extruded and cross-linked polymer material is cooled to ambient temperatures.

46. The process according to claim 1, wherein said polymer material is shaped by extrusion onto a supporting unit in the extrusion station, and wherein the supporting unit is a metallic material.

47. The process according to claim 46, wherein the supporting unit is in the form of a reinforcing layer of the flexible unbonded offshore pipe, said metallic material reflecting at least part of the infrared radiation applied in the cross-linking zone.

48. The process according to claim 1, wherein said polymer material is shaped by extrusion onto a supporting unit in the extrusion station, and wherein the supporting unit is an armour layer of the flexible unbonded offshore pipe, said armour layer comprising a secondary layer in the form of a tape applied onto the armour, the polymer composition being extruded onto said tape.

49. The process according to claim 1, wherein said polymer material is shaped by extrusion onto a supporting unit in the extrusion station, and wherein the supporting unit is an armour layer of the flexible unbonded offshore pipe, said armour layer comprising a secondary layer in the form of a gas permeation barrier applied onto the armour, the polymer composition being extruded onto said gas permeation barrier.

50. The process according to claim 49, wherein said gas permeation barrier is impermeable to liquid and gas.

51. The process according to claim 48, wherein said secondary layer has a reflective surface reflecting the electromagnetic waves applied in the cross-linking zone.

52. The process according to claim 51, wherein , said reflective surface of the secondary layer being capable of reflecting at least 50% of the not adsorbed electromagnetic waves.

53. The process according to claim 1, wherein a velocity of the extrusion of the polymer material is approximately equal to a velocity of the extruded polymer passing through the cross-linking zone.

54. The process according to claim 1, wherein the polymer layer is an inner liner of the offshore pipe.

55. The process according to claim 1, wherein the polymer layer is an inner liner of the offshore pipe, said inner liner having a thickness of 8 mm or more.

56. The process according to claim 1, wherein the polymer layer is an inner liner of the offshore pipe, said inner liner having a thickness of 12 mm or more.

57. The process according to claim 1, wherein the polymer layer is an inner liner of the offshore pipe, said inner liner having a thickness of 16 mm or more.

58. The process according to claim 1, wherein the polymer layer is an inner liner of the offshore pipe, said inner liner having a thickness of 18 mm or more.

59. A method for the production of a flexible unbonded offshore pipe, said method comprising the steps of
i) providing a carcass
ii) applying a gas permeation barrier layer onto the carcass,
iii) applying an inner liner in the form of a polymer layer using the process as defined in claim 1, wherein the polymer material is applied onto a supporting unit comprising said carcass and said liner, and
iv) applying one or more reinforcing layers onto the inner liner.

60. The method for the production of a flexible unbonded offshore pipe, said method comprising the steps of
i) providing an inner liner in the form of a polymer layer using the process as defined in claim 1, wherein the polymer material is applied into a supporting unit,
ii) applying a gas permeation barrier layer onto the inner liner
iii) applying one or more reinforcing layers onto the inner layer.

61. The method according to claim 59, wherein the gas permeation barrier layer is a wound or folded layer of a foil, such as a metal foil, the foil preferably being wound or folded with overlapping edges.

62. The method according to claim 59, wherein the gas permeation barrier layer is an extruded polymer layer.

63. The method according to claim 59, wherein said gas permeation barrier layer is sufficiently impermeable to gas to prevent a gas selected from the group consisting of methane, hydrogen sulphides, and carbon dioxides at a pressure of 5 bars from diffusing through the layer to another side thereof with a pressure of 1 bar.

64. The process according to claim 1, wherein the extrusion and cross-linking are carried out in an in-line process, including passing the extruded polymer material from the extruder through a cross-linking zone to activate said peroxide to thereby cross-link the polymer material, and wherein said activation is performed by applying the infrared radiation in the cross-linking zone, said polymer material being passed from the extruder to the cross-linking zone with less than 25° C. average intermediate cooling.

* * * * *

UNITED STATES PATENT AND TRADEMARK OFFICE
CERTIFICATE OF CORRECTION

| | | |
|---|---|---|
| PATENT NO. | : 7,829,009 B2 | Page 1 of 1 |
| APPLICATION NO. | : 10/507215 | |
| DATED | : November 9, 2010 | |
| INVENTOR(S) | : Inger-Margrethe Procida | |

It is certified that error appears in the above-identified patent and that said Letters Patent is hereby corrected as shown below:

In the specification, column 7, line 67, replace the letter "t" between "85" and "according" with -- % --

In the specification, column 13, line 10, replace "9and" with -- 9 and --

In the claims, column 14, line 42, replace "into" with -- onto --

In the claims, column 16, line 25, replace "2bars" with -- 2 bars --

In the claims, column 16, line 40, replace "150and" with --150 and --

In the claims, column 17, line 16, remove "," between "wherein" and "said"

Signed and Sealed this
Fifteenth Day of March, 2011

David J. Kappos
*Director of the United States Patent and Trademark Office*

(12) EX PARTE REEXAMINATION CERTIFICATE (8947th)
United States Patent
Procida (10) Number: US 7,829,009 C1
(45) Certificate Issued: Apr. 3, 2012

(54) PROCESS FOR THE PRODUCTION OF A POLYMER LAYER OF A FLEXIBLE OFFSHORE PIPE AND A FLEXIBLE UNBONDED OFFSHORE PIPE

(75) Inventor: Inger-Margrethe Procida, Hellerup (DK)

(73) Assignee: NKT Flexibles I/S, Brondby (DK)

Reexamination Request:
No. 90/011,889, Oct. 17, 2011

Reexamination Certificate for:
Patent No.: 7,829,009
Issued: Nov. 9, 2010
Appl. No.: 10/507,215
Filed: Sep. 16, 2004

Certificate of Correction issued Mar. 15, 2011.

(22) PCT Filed: Mar. 20, 2003

(86) PCT No.: PCT/DK03/00191
§ 371 (c)(1),
(2), (4) Date: Sep. 16, 2004

(87) PCT Pub. No.: WO03/078134
PCT Pub. Date: Sep. 25, 2003

(51) Int. Cl.
*B29C 47/00* (2006.01)
*B29C 35/08* (2006.01)

(52) U.S. Cl. .................. 264/476; 264/177.18; 264/493; 264/494; 264/495; 264/173.11; 264/464; 264/477; 264/209.6; 264/236; 264/448; 264/492; 264/177.17; 264/209.1

(58) Field of Classification Search ........................ None
See application file for complete search history.

(56) References Cited

To view the complete listing of prior art documents cited during the proceeding for Reexamination Control Number 90/011,889, please refer to the USPTO's public Patent Application Information Retrieval (PAIR) system under the Display References tab.

*Primary Examiner* — Alan Diamond (57) ABSTRACT

The invention relates to a process for the production of a polymer layer of a flexible unbonded offshore pipe. The process comprises the steps of shaping a polymer material by extrusion into or onto a supporting unit in an extrusion station and cross-linking said extruded polymer material, said polymer material comprising a polyethylene and a peroxide for providing a cross-linking of the polymer material. The peroxide has an activation temperature substantially above the temperature of the polymer material during the extrusion thereof. The cross-linking of the extruded polymer material is carried out by exposing the extruded polymer material to electromagnetic waves, selected from the group consisting of infrared radiation and microwave.

The invention also relates to a flexible unbonded offshore pipe comprising such polymer layer.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 5-7, 24-42, 55-60 and 64 is confirmed.

Claims 3, 4, 8-23, 43-54 and 61-63 were not reexamined.

\* \* \* \* \*